United States Patent [19]

Szeto et al.

[11] Patent Number: 4,626,843
[45] Date of Patent: Dec. 2, 1986

[54] MULTI-MASTER COMMUNICATION BUS SYSTEM WITH PARALLEL BUS REQUEST ARBITRATION

[75] Inventors: Kenneth H. Szeto, Lawndale; Frank A. Hill, Manhattan Beach, both of Calif.

[73] Assignee: TRW Inc., Redondo Beach, Calif.

[21] Appl. No.: 536,414

[22] Filed: Sep. 27, 1983

[51] Int. Cl.[4] ............................................. H04Q 1/00
[52] U.S. Cl. ............................. 340/825.5; 340/825.14; 370/85
[58] Field of Search ........... 340/825.5, 825.51, 825.52, 340/825.53, 825.08, 825.09, 825.14, 825.2; 370/85, 95, 96, 86, 90, 91, 92, 94; 364/200, 900

[56] References Cited

U.S. PATENT DOCUMENTS

| | | | |
|---|---|---|---|
| 3,796,992 | 3/1974 | Nakamura et al. | 340/147 LP |
| 3,832,689 | 8/1974 | Means et al. | 340/147 LP |
| 3,958,226 | 5/1976 | Kuroda et al. | 340/172.5 |
| 3,978,451 | 8/1976 | Ito et al. | 340/147 LP |
| 3,985,962 | 10/1976 | Jones et al. | 179/15 AL |
| 4,058,681 | 11/1977 | Imaizumi et al. | 179/15 AL |
| 4,096,355 | 6/1978 | Rothauser et al. | 179/15 AL |
| 4,148,011 | 4/1979 | McLagan et al. | 340/147 LP |
| 4,161,786 | 7/1979 | Hopkins et al. | 364/900 |
| 4,232,294 | 11/1980 | Burke et al. | 340/825.5 |
| 4,262,357 | 4/1981 | Shima | 370/85 |
| 4,271,505 | 6/1981 | Menot et al. | 370/85 |
| 4,320,457 | 3/1982 | Tanikawa | 364/200 |
| 4,334,288 | 6/1982 | Booher | 364/900 |
| 4,359,731 | 11/1982 | Beauford et al. | 340/825.51 |
| 4,385,382 | 5/1983 | Goss et al. | 340/825.5 X |
| 4,488,218 | 12/1984 | Grimes | 340/825.5 X |
| 4,541,043 | 9/1985 | Ballegeer et al. | 364/200 |

FOREIGN PATENT DOCUMENTS 0035731 9/1981 European Pat. Off. .
0063972 11/1982 European Pat. Off. .

Primary Examiner—Ulysses Weldon
Attorney, Agent, or Firm—Noel F. Heal; Robert J. Stern; Donald R. Nyhagen

[57] ABSTRACT

Apparatus and a related method for regulating access to a communication bus to which multiple communication nodes are connected. Control logic at each of the nodes determines which of them has priority to access the bus, by means of a parallel arbitration sequence in which all nodes contending for bus access participate. Specifically, each contending node generates a relative priority node number and asserts it onto an arbitration bus. All of the asserted node numbers are logically combined into a composite node number on the bus, and the winning node is determined in a bit-by-bit ripple comparison circuit at each node, the composite node number being compared with the locally generated relative priority node number. Priority is determined in advance of data transmission, and synchronization and arbitration take place without any central or master control unit.

17 Claims, 5 Drawing Figures

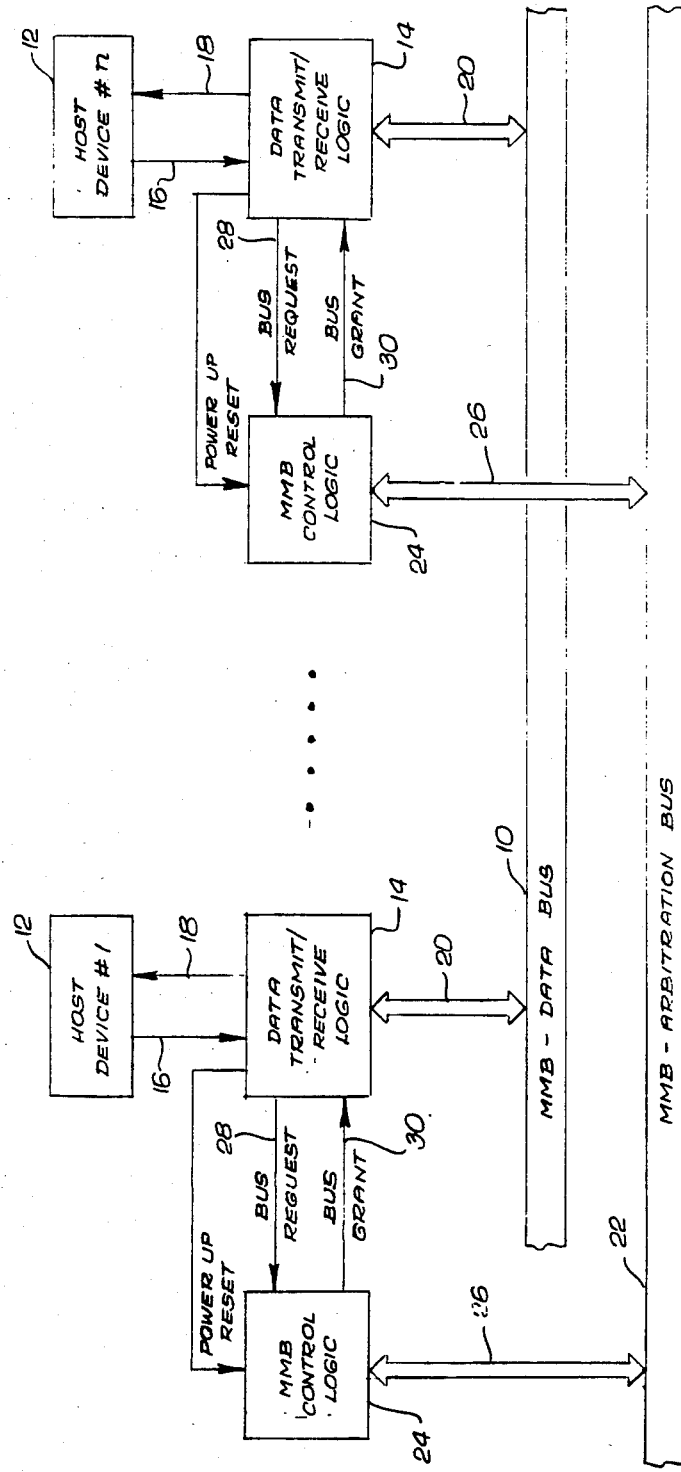

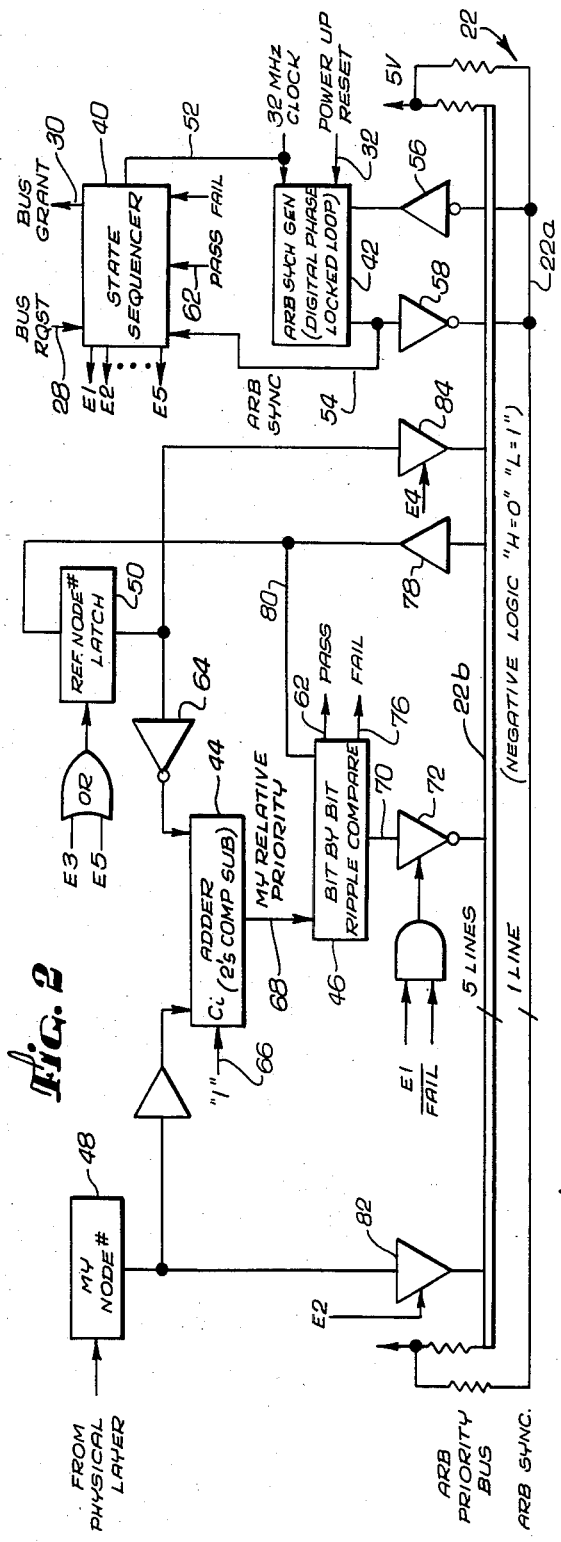
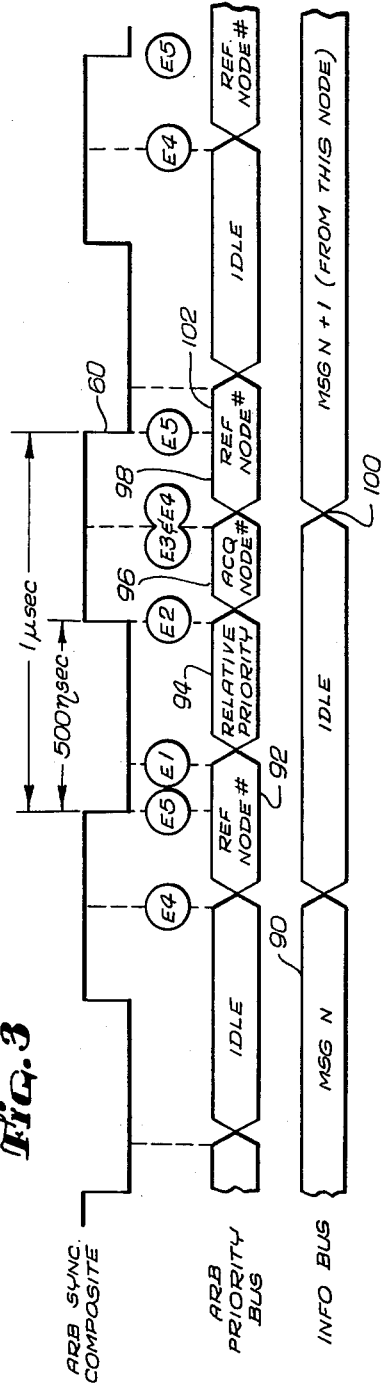

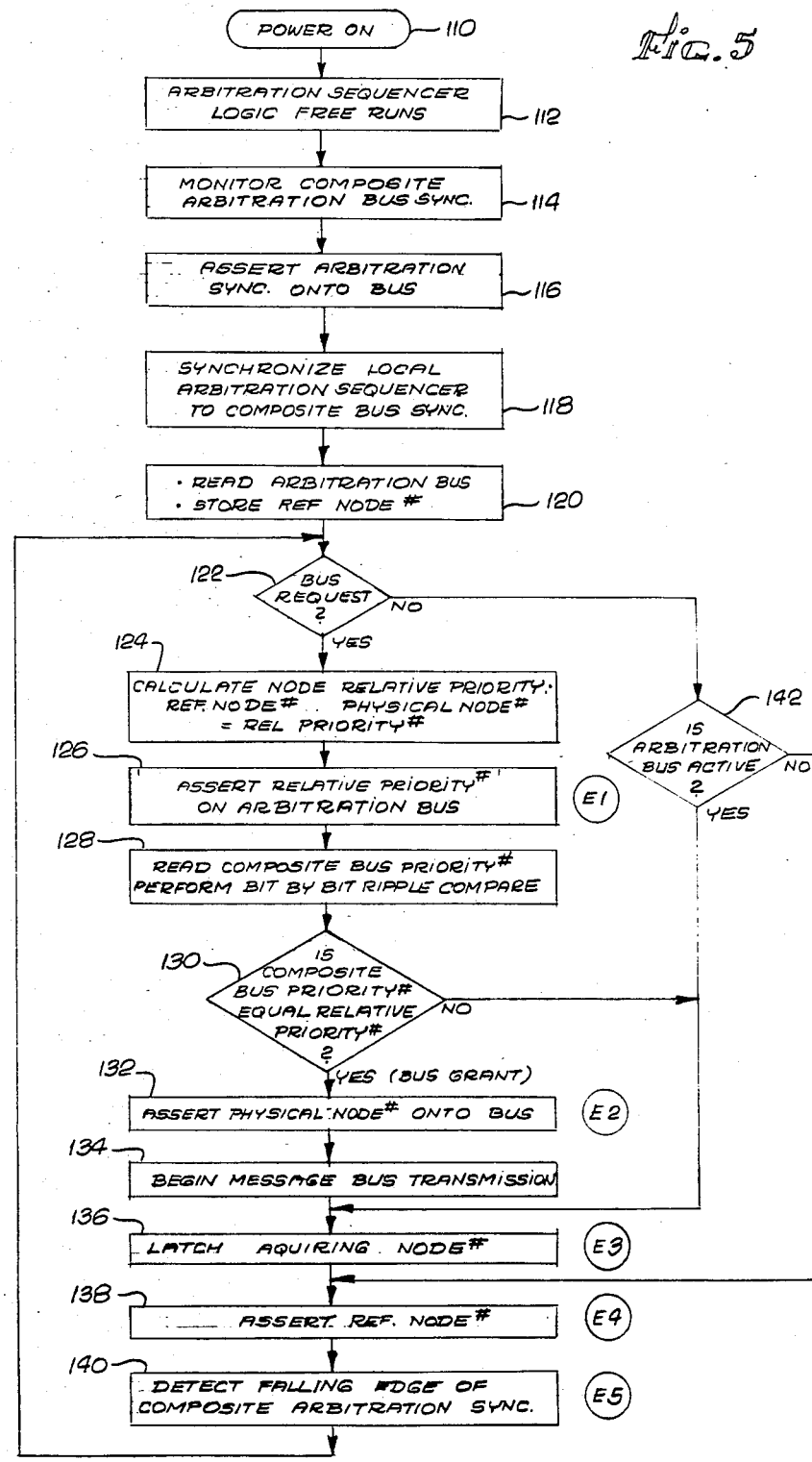

MULTI-MASTER COMMUNICATION BUS SYSTEM WITH PARALLEL BUS REQUEST ARBITRATION

CROSS-REFERENCE TO RELATED APPLICATION

This invention was made with Government support under contract No. DASG60-C-0038 awarded by the Department of the Army, Ballistic Missile Defense Systems Command. The Government has certain rights in this invention.

This application is closely related to a commonly assigned application, Ser. No. 536,466, filed on Sept. 27, 1983 Syed Akbar and entitled "Multi-Master Communication Bus."

BACKGROUND OF THE INVENTION

This invention relates generally to communication networks comprising interconnected computers and other devices. More particularly, the invention relates to local-area networks in which a number of communication stations or nodes are connected to a common communication bus. Networks of this general type for the interconnection of computers and other devices are becoming increasingly common. The principal objective in designing such a network is to provde a convenient way for the separate devices or nodes to transmit messages and information from one to another. Instead of having to provide costly interconnections between all possible pairs of the devices, a single communication bus is employed.

When one device has information to send to another, a message is transmitted onto the bus, and is read by the device to which the message is intended to be transmitted. One major task in designing a network of this type is to establish a scheme for resolving conflicts for the use of the bus. In this regard, there are two main types of network designs. One is what is commonly referred to as a contention scheme, in which conflicts for use of the bus are resolved at the time they arise, in accordance with a fixed set of priorities. If two nodes on the bus attempt to transmit at practically the same time, priority may be determined, for example, by the physical locations of the nodes, such that the node nearest one end of the bus is the first to transmit. One well known network system of the contention type is known by the name Ethernet, and is described in U.S. Pat. No. 4,063,220 to Metcalfe et al.

The other major type of network uses some form of time slot allocation scheme, wherein each of the nodes is assigned a time slot in which it may transmit on the bus. These are all basically time-division multiplexing schemes. In the simplest form of time slot allocation scheme, the node allocations are fixed, and the system may be very inefficient when not all of the nodes are equally busy. If the time slots are dynamically allocated, there is still a priority problem to be resolved. In the past, a system of fixed priorities based on some physical parameter has been the usual approach to resolving this difficulty.

Another important factor that has often dictated against the choice of a time slot allocation scheme is that some form of synchronization of the nodes is required, to make sure that each node can determine its proper time slot for transmission of data. This has necessitated the use of a master station at some location on the bus, to generate appropriate timing signals for use by the other nodes, which become, in effect, "slave" units. Reliance on a master station poses obvious reliability problems, since the integrity of the entire network then depends on a single master station.

It will be appreciated from the foregoing that there is a need for a local-area network that both avoids the use of fixed priorities for bus access, and avoids the use of a single master station for purposes of synchronization. The present invention fulfills this need.

SUMMARY OF THE INVENTION

The present invention resides in a multimaster communication bus system in which none of the connected nodes functions as a single master station, and arbitration among multiple requests for bus access is performed prior to message transmission by a novel parallel arbitration scheme. As in the invention described and claimed in the cross-referenced application, timing and sequencing of message transmissions is a function that is distributed among all of the active nodes connected to the bus, so that one may consider all of the nodes to be master stations.

In simple terms, the bus system of the invention employs a data bus and an arbitration bus, and includes, at each node, multi-master bus control logic for performing all timing functions, and for determining priority of bus access in a parallel fashion, i.e. at the same time as all of the nodes on the bus. More specifically, the multi-master bus control logic includes means for transmitting synchronization signals over the arbitration bus to maintain system synchronization, means for determining and transmitting a relative node priority if bus access has been requested, means for receiving from the arbitration bus a composite node number that is a logical combination of all of the transmitted relative node priorities, and means for comparing the composite node number with the transmitted relative node number to determine whether this node will be the next to transmit a message.

The basic inventive concept is independent of the nature of the source and destination of the data messages. There may, for example, be a computing device located at each node. When the computing device has a message to transmit, it makes a bus request to the multi-master bus control logic, which then obtains access to the bus and signals the computing device that transmission may begin, or that it may begin as soon as a current transmission has ended. Access to the bus is granted on a round-robin basis, with each node having equal chance to transmit as soon as its turn comes up. In the round-robin scheme, a node that has just completed transmission has the lowest priority for the next message transmission. The nodes are each given an access opportunity in turn, beginning with one adjacent to the one that was last granted bus access, and ending with the one that was last granted bus access.

If a node has a number of message transmissions to make, it may obtain repeated access to the bus, until such time as another node requests the bus. Then, the first node will have to relinquish the bus, at least temporarily. If the message traffic is relatively heavy and is generated uniformly by all the nodes, the nodes will share access to the bus on a round-robin basis, without preference for any particular bus.

In the illustrative embodiment of the invention, the means for determining and transmitting the relative node priority includes means for computing the difference between the node number of the last node to send a message and the node number of the local node, and means for transmitting the resultant difference onto the arbitration bus, which includes means for logically ORing all of the the transmitted relative node priorities to obtain the composite node number. The means for comparing the composite node number with the locally generated relative node priority includes a bit-by-bit ripple comparison circuit, having means for successively comparing corresponding bits in the two node numbers, means for withdrawing the node from contention if there is no match between any compared bits, and means for generating a bus grant signal if all of the bits are found to match. The arbitration control logic also includes timing means for generating timing signals to control the arbitration sequence.

In accordance with the method of the invention, arbitration among conflicting requests are resolved in a parallel fashion at all of the nodes. More specifically, the method comprises the steps of storing the number of the last node to send a data transmission; computing, in response to a bus request signal, a relative node priority, by determining the difference between the number of the last node to transmit and the the local node number; asserting the relative node priority onto the arbitration bus; generating on the bus a composite node number from all of the asserted relative node priorities; and detecting the composite node number on the bus.

The next and most important step in determining priority is to perform a bit-by-bit comparison between the detected composite node number and the locally computed relative node priority. If there is a non-match at any bit stage, the relative node priority is no longer asserted onto the bus and the node is withdrawn from contention for bus access. The composite node number is then regenerated. If all bits are found to match, a bus grant signal is generated and a message transmission may begin. Additional steps in the method include asserting onto the arbitration bus the physical node number of the node being granted bus access, then latching this node number into a register at each node, to store the number of the last node to transmit. This latched node number is periodically asserted and relatched by all nodes, to ensure that all nodes are registering the correct last node number.

It will be appreciated from the foregoing that the present invention represents a significant advance in the field of communication buses for local-area networks. In particular, the invention provides a single-bus communication system in which multiple nodes have equal access to the bus without the need for a central or master station to maintain synchronism, and in which arbitration between contenders for access to the bus is performed in a reliable and rapid parallel fashion prior to data transmission, again without a central or master control station. These and other aspects of the invention will become apparent from the following more detailed description, taken in conjunction with the accompanying drawings.

BRIEF DESCRIPTION OF THE DRAWINGS

FIG. 1 is a simplified block diagram of a multi-master bus communication system embodying the present invention;

FIG. 2 is block diagram of the multi-master bus control logic of the invention;

FIG. 3 is a timing diagram showing typical relationships between various signals on the arbitration bus and the information or data bus;

FIG. 5 is a flowchart illustrating the functions performed by the arbitration control logic of FIG. 2.

DESCRIPTION OF THE PREFERRED EMBODIMENT

Figure 4:
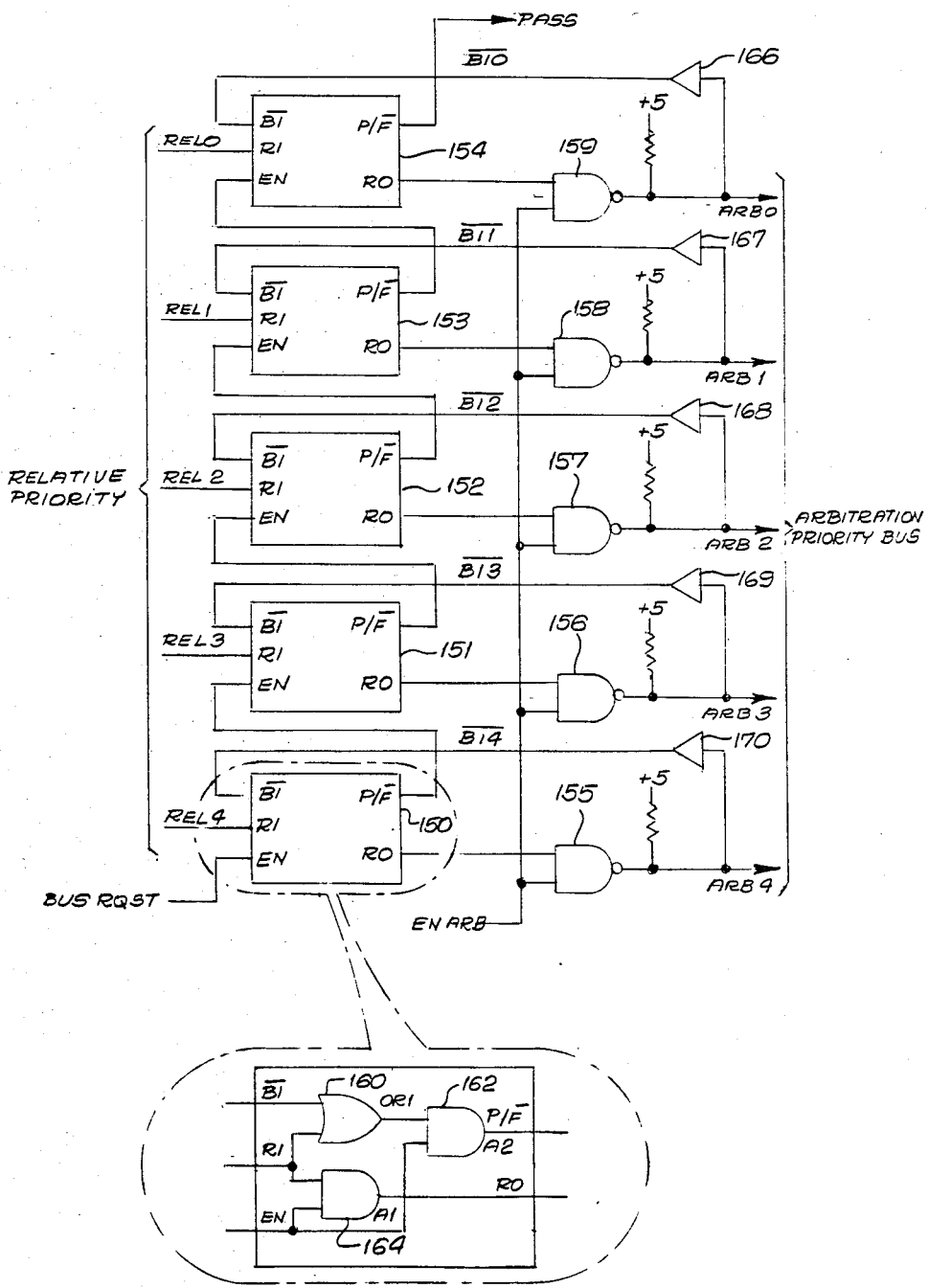
FIG. 4 is a schematic diagram including the bit-by-bit ripple comparison circuit employed in the multi-master bus control logic of FIG. 2.

As shown in the drawings for purposes of illustration, the present invention is concerned with communication networks or computer networks in which multiple communication nodes are connected to a single data communication bus, indicated by reference numeral 10 in FIG. 1. A typical network includes a plurality of host devices, two of which are shown at 12 in FIG. 1, each having associated with it transmit/receive logic 14. Each host device 12 may be a computer, for example, but in general may be any source or destination of data. Each host device 12 communicates with its transmit/receive logic 14 over lines 16 and 18, and the transmit/receive logic 14 communicates with the data bus 10 over the bidirectional line 20. The specific design of the transmit/receive logic 14 will depend largely upon the nature of the host device 12, and does not form part of the invention.

Ideally, in most applications a communication network should provide each node with an equal opportunity to access the bus 10. In the past, equality of access opportunity has been provided only at the expense of a master timing unit to ensure that the nodes are properly synchronized.

In accordance with the invention, the system includes an arbitration bus 22 parallel to the data bus 10, and each host device 12 has associated with it multi-master bus control logic 24, whose function is to arbitrate in a parallel fashion among contending users of the bus 10 prior to each message transmission, and to synchronize bus operations without the use of a master station or central controller. The multi-master bus control logic 24 communicates with the arbitration bus 22 over bidirectional lines 26. When the transmit/receive logic 14 is ready to transmit a message on the data bus 10, a bus request is sent to the multi-master bus (MMB) control logic 24, as indicated by line 28. When access to the data bus 10 has been obtained, the transmit/receive logic 14 is informed by a signal on line 30. The MMB control logic 24 also receives a power-up reset signal from the transmit/receive logic 14, over line 32, to indicate that the node has just been powered up or reset for some other reason.

FIG. 2 illustrates the MMB control logic 24 in more detail. Its principal components are a state sequencer circuit 40, an arbitration sync generator 42, an adder 44, a bit-by-bit ripple comparison circuit 46, a register 48 for storing the local or "my" node number, and a latch 50 for storing a reference node number that indicates the number of the last node to be granted access to the data bus 10. The state sequencer 40 is basically a timer or counter that is driven by high-frequency clock signals over line 52 from a clock signal generator (not shown), and is synchronized to arbitration sync signals generated by the synch generator 42 and coupled to the state sequencer over line 54. The sequence 40 generates a sequence of timing signals indicated by E1 through E5. These signals control initiation of an arbitration sequence, and related activity on the arbitration bus 22.

The arbitration sync generator 42 detects a sync signal on one line 22a of the arbitration bus 22, receiving the signals through an inverter 56, and generates arbitration sync signals for transmission through another inverter 58 onto the line 22a. The sync signal is basically a square wave like the one shown at 60 in FIG. 3, and is generated continuously if there is at least one active node on the bus. The sync generator 42 may be of any conventional design, and may, for example, include a digital phase-locked loop. When power is first applied to the node, a signal on line 32 initiates operation of the sync generator, which monitors the bus sync line 22a for a composite sync signal, and synchronizes a generated sync signal with the composite sync signal on the bus line.

Operation of the state sequencer 40 is keyed to the falling edge of the sync signal, as conveyed to the sequencer over line 54. The falling edge of the sync signal corresponds to the timing signal E5. The signal E1 is generated a predetermined time interval later, but only if a bus request signal has been received over line 28, and E1 initiates the arbitration sequence, to be described in detail. The signal E2 is generated at the same time as the next rising edge of the sync signal, but only if E1 was generated and if this node was selected to be the next one to acceess the bus, i.e. a bus grant signal was generated on line 30. Likewise, timing signal E3 is generated subsequently to E2 only if a bus grant signal has been generated. Timing signal E4 is generated close after E3, and E5 follows when the sync signal 60 falls again. Signals E4 and E5 are generated in every sync pulse cycle, regardless of whether a bus request is made or granted.

The hardware that performs the arbitration sequence will first be described with reference to FIG. 2, although its mode of operation may not beome clear until a specific example, involving multiple nodes, has been considered. Arbitration comprises three distinct but closely related operations. First, if a bus request has been made, a relative node priority is computed and asserted on the arbitration priority bus 22b, which consists of enough binary signal lines to code the largest node number in the system. Next, the priority bus 22b generates a composite node number derived from all of the relative node priorities asserted on it. In logical terms the composite node number is the logical OR of the asserted relative node priorities. The final operation is a bit-by-bit comparison between the composite node on the bus 22b and the locally generated relative node priority. When a non-matching bit is found, the node is automatically withdrawn from contention for bus access and the composite node number may change accordingly. Ultimately, only one of the contending nodes will survive the bit-by-bit comparison, and a pass signal will be generated by the comparison circuit 46, on line 62. It will be appreciated from the more detailed description that follows that the three operations described are very closely related, and in some respects overlap. However, the simplified block diagram of FIG. 2 will facilitate a basic understanding of the arbitration sequence.

More specifically, the relative node priority is determined by computing the difference between the local node number stored in register 48 and the number of the last node to transmit, stored in latch 50. As illustrated in FIG. 2, the last node number, or reference node number, is subtracted from the local node number. However, the subtraction may be performed in the opposite sense without affecting the inventive concept. The only effect of the opposite subtraction would be that priority would be rotated in the opposite cyclic direction.

The subtraction is performed by complementing or inverting the reference node number in inverter 64 and applying the local node number as a non-inverted input to the adder 44. To provide subtraction in a two's complement sense, a logical "1" carry bit is input to the adder, as shown at 66. As will become apparent from a specific example, the output of the adder 44 provides a direct measure of relative priority on a round-robin basis. The highest priority will be given to a node immediately adjacent in number to the one that most recently gained bus access. The next highest priority will be adjacent in node number to the highest, and so forth. The lowest priority node will be the one that has most recently gained bus access.

The relative node priority is transferred to the bit-by-bit comparison circuit 46 over line 68, and is coupled through the comparison circuit and over line 70 to an inverting gate 72, and thence to the arbitration priority lines 22b. The gate 72 is enabled by the presence of two signals, which are ANDed together in AND gate 74. One is the E1 timing signal from the state sequencer 40, and the other is an inverted FAIL signal derived from a non-inverted FAIL signal on line 76 from the comparison circuit 46. Thus, when the E1 timing signal is supplied to initiate argitration, and so long as there has been no failed bit comparison in the comparison circuit 46, the relatively node priority will be asserted on the bus 22b in inverted form.

Each line of the priority bus 22b employs negative logic, in which a high signal represents a logical "0" and a now signal level represents a logical "1". Basically, each line of the bus 22b operates as a wired logical OR device. If a logical "1" is asserted on a line of the bus 22b by any node, the bus will stay at its low, logical "1" level regardless of the assertion of any logical "0" signals by other nodes on the bus. In effect, then, the bus will carry a composite node number that is the logical OR of all of the asserted relative node priorities. The inverted form of the composite node number is read back into the comparison circuit 46 through amplifier 78 and over line 80, for comparison with the locally generated relative node priority on line 68. Operation of the comparison circuit 46 will be described in detail with reference to FIG. 4. For present purposes, it need only be understood that the comparison circuit 46 will either generate a FAIL signal on line 76 or a PASS signal on line 62. If a FAIL signal is generated, the inverted form of this signal no longer enables AND gate 74, and the relative node priority is no longer asserted on the arbitration bus 22b. In effect, the node has dropped itself from contention for bus access. On the other hand, if a PASS signal is generated, the state sequencer 40 responds by generating a bus grant signal on line 30 and by generating an E2 timing signal.

The E2 timing signal enables a gate 82, through which the local node number stored in register 48 is gated onto the arbitration priority bus. The purpose of this step is to provide to every node the identity of the "winning" node in the arbitration sequence. At a subsequent time in the sync signal cycle, an E3 signal is generated, to clock the latch 50 used to store the reference node number. Thus, upon the occurrence of timing signal E3, a new reference node number is clocked into the latch 50. Almost immediately after E3, timing signal E4 is generated. This enables another gate 84, through which the reference node number stored in latch 50 is gated onto the priority bus 22b. Still later, when the sync signal falls, timing signal E5 is generated to clock the latch 50 again, and load it with the node number presently asserted on the bus.

The foregoing timing relationships are illustrated diagrammatically in FIG. 3. As indicated at 90, a message is being transmitted on the information bus 10 prior to the exemplary arbitration sequence. Then, as indicated at 92, the current reference node is "echoed" to all nodes on the bus. Timing signal E4 asserts the reference node number on the bus at each node, and timing signal E5 clocks the asserted reference node number into the latch 50 at each node. The next significant event is the generation of an E1 timing signal, resulting from a bus request. During the period indicated at 94, arbitration among competing nodes is performed in the manner described above. In the winning node, E2 and E3 timing signals are generated after the arbitration sequence, and the number of the winning node is transmitted to the bus and latched at each node. This activity is indicated by reference numeral 96. At this point, a new message transmission can begin, as indicated at 100. Then, timing signals E4 and E5 again result in the echoing of the reference node number by and to all nodes, as indicated at 102.

As indicated in the timing diagram of FIG. 3, arbitration in the presently preferred embodiment of the invention is not started until the completion of a prior message. Since arbitration is so fast, less than a microsecond, no significant inefficiency is introduced by performing arbitration during an inter-message gap. However, there is nothing inherent to the invention that imposes this limitation. Since the arbitration bus 22 is completely separate from the data bus 10, the arbitration could be performed while a message was still being transmitted, and the bus grant signal then made conditional on there being a cessation of bus activity.

Before proceeding to a further description of the arbitration sequence, it is appropriate to consider a specific example of arbitration. The example in Table 1 assumes that the reference node number is 3 (00011 binary), and that the arbitration priority bus 22b has five lines, to accommodate five-bit node numbers.

TABLE 1

| | Rel. Prty. | Bit 4 compare | Bit 3 compare | Bit 2 compare | Bit 1 compare | Bit 0 compare |
|---|---|---|---|---|---|---|
| Node # | | | | | | |
| 4 | 00001 | Fail | — | — | — | — |
| 3 | 00000 | Fail | — | — | — | — |
| 1 | 11110 | Pass | Pass | Pass | Pass | Win bus |
| 0 | 11101 | Pass | Pass | Pass | Fail | — |
| 29 | 11010 | Pass | Pass | Fail | — | — |
| Compos. Node # | | 11111 | 11111 | 11111 | 11111 | 11110 | 11110 |

The computation of the relative node priorities is made using two's complement arithmetic. For example, the result for node #4 is obtained by inverting the reference node number, giving 11100, then adding the local node number 00100 and the constant carry of 00001. The result, ignoring overflow, is 00001, which might have been expected from he decimal equivalent: 4−3=1. By a similar process, the relative priority for node #3 is zero. For node numbers less than the reference node number, the result is not always so obvious. For the winning node, node #1, the relative priority is determined by adding the complement of three, or 11100, to 00001 and the carry input of 00001. The result is 11110, or 30 in decimal terms.

If one were to consider all the nodes from #0 to #31, the relative priorities would start at #0 for the reference node, #1 for the node number one greater than the reference node, and so forth up to node #31, whose relative priority is (31−reference node #). Then, node #0 has a relative priority one greater than that of node #31, and so forth up to a relative priority of #31 for the node with a number one less than that of the reference node. The effect of the bit-by-bit comparison is to choose the contending node with the greatest relative node number. In the example of Table 1, if node #2 had requested the bus it would have received the grant, since its relative node number is the sum of 00010, 11100 and 00001, which is 11111, or 31 decimal.

FIG. 5 shows operation of the MMB control logic at each node in flowchart form. When power is first applied to the node, as shown at 110, the state sequencer is free-running and not yet synchronized to anything, as indicated at 112. As described in blocks 114 and 116, the sync generator 42 monitors the bus for any composite sync signals that are already present, and asserts its own sync signal onto the bus in synchronism with the composite signals. The next step, in block 118, is to sychronize the state sequencer 40 with the composite sync signals on the bus.

The remaining initialization step, shown in block 120, is to read the arbitration bus into the reference node number latch 50, using timing signal E5. Then, if there is a bus request at this node, as determined in block 122, the relative node priority is calculated, as indicated in block 124, and asserted onto the bus, as shown in block 126. In block 128, the composite node number is read from the bus, and in block 130 is compared with the locally generated relative node priority. If there is a complete match, the local node number is asserted on the bus, as shown in block 132, and message transmission is started, as indicated in block 134. If there is no match in the comparison of block 130, the next two steps in blocks 132 and 134 are skipped, and in block 136 the number of the acquiring node is latched. Finally, as indicated in blocks 138 and 140, the number of the reference node, or the last acquiring node, is echoed onto the bus by all nodes, and subsequently latched again at all nodes. Then a return is made to block 122 to determine if there is a bus request. In the present embodiment of the invention, node arbitration is conditioned not only on receiving a bus request, but also on there being no present activity on the data bus 10.

If the test for a bus request in block 122 has a negative result, there is an additional test to determine if the arbitration bus is active, as indicated in block 142. If it is, the arbitration steps are skipped, and control is transferred to the step of latching the acquiring node number, in block 136. If the arbitration bus is not active, no node is currently requesting the bus, and control is transferred to block 138, to echo the reference node onto the bus.

The bit-by-bit ripple comparison circuit 46 is shown in more detail in FIG. 4. The circuit includes five identical comparison blocks 150–154 and five corresponding NAND gates 155–159. Each of the comparison blocks has a relative node input (RI), a relative node output (RO), an inverted bus input ($\overline{BI}$), an enable input (EN), and a pass/fail output (P/F). As shown, each comparison block 150-154 includes an OR gate 160, and two AND gates 162 and 164. The OR gate 160 has as inputs the signals RI and $\overline{BI}$, and provides its output as one input to AND gate 162. The other input to AND gate 162 is the enable signal EN, and the output is the pass-/fail signal P/F. The relative node priority input RI is also applied to the other AND gate 164, which also receives as its second input the enable signal EN. The output of AND gate 164 is the relative node priority output signal RO.

The relative node priority output signals RO from each of the comparison blocks 150-154 is applied as an input to a respective one of the NAND gates 155-159. The other input of each NAND gate 155-159 is the timing signal E1 employed to enable the arbitration sequence. The outputs of the NAND gates 155-159 are applied to the arbitration priority bus 22b. The five bus signals are also fed back through respective amplifiers 166-170 to the $\overline{BI}$ inputs of the comparison blocks 150-154/

In each of the comparison blocks 150-154, there are only three possible logical combinations: (a) the relative node priority is a "1" and the bus also supplies a "1", (b) the relative node priority is a "0" and the bus supplies a "0" because no other node has asserted a "1", and (c) the relative node priority is a "0" and the bus supplies a "1" because another node has asserted a "1". Because of the logical OR action of the bus, it is impossible for the bus to supply a "0" if the relative node priority asserts a "1".

Case (a) is the simplest. In the first-stage comparison block 150, if RI is a "1" OR gate 160 has its output enabled, and if there is a bus request signal to enable AND gate 162, there will be a "1" signal on the P/F line from the comparison block. This line is fed to the enable line EN of the next comparison block 151, which enables the next stage of the comparison. In case (b), a "0" is input on line RI, which will therefore not enable an output from OR gate 160. However, the "0" level on output RO is inverted in NAND gate 155 and is encoded as a "1" in the bus's negative logic. Thus, input $\overline{BI}$ is a "1", which is propagated through OR gate 160 and AND gate 162 to the P/F output line to the next stage. Finally, in case (c) a "1" asserted onto the bus by another node's relative priority shows up as a "0" at the $\overline{BI}$ input to the comparison block. If the RI input is also a "0", the output of OR gate T60 and AND gate 162 will also be "0" and an enable signal will not be propagated to the next stage.

If a pass signal is not generated at any stage, the next stage is not enabled and the node is effectively removed from contention. The enable lines EN of all but the first comparison block 150 are, therefore, equivalent in function to the FAIL line 76 in FIG. 2. If the final stage comparison block 154 passes the test, a "1" is output on the PASS signal line 62 to the state sequencer 40, which is thereby conditioned to output an E2 timing signal and a subsequent E3 timing signal, to transmit the acquiring node number to all nodes.

It will be appreciated from the foregoing that the present invention represents a significant advance in the field of communication networks having multiple nodes connected to a common bus. In particular, the invention provides a novel technique for arbitrating among competing requests for bus access, without any central or master node unit. It will also be appreciated that, although a specific embodiment of the invention has been described in detail for purposes of illustration, various modifications may be made without departing from the spirit and scope of the invention. Accordingly, the invention is not to be limited except as by the appended claims.

We claim:

1. A multi-master communication bus system having a plurality of communication nodes, said system comprising:
   a data bus for the transmission of information from node to node;
   an arbitration bus for the transmission of synchronization signals and signals for the resolution of conflicts between multiple requests for bus access;
   means located at each node for detection and generation of synchronization signals on said arbitration bus;
   means located at each node for registering a unique node number associated with each node;
   means located at each node and responsive to a locally generated request for bus access, for determining and asserting onto said arbitration bus a relative node priority;
   means associated with said arbitration bus for generating a composite node number from all relative node priorities asserted onto said bus;
   bus request resolution means located at each node for detecting the composite node number and determining therefrom whether the request for bus access is successful;
   means located at each node for asserting onto said arbitration bus the number of the node that has been granted bus access;
   means located at each node for registering the number of the last node to be granted bus access; and
   timing means located at each node, to regulate operations in relation to the synchronization signals.

2. A multi-master communication bus system as set forth in claim 1, wherein said means for determining and asserting a relative node priority includes:
   means for computing the relative node priority as the difference between the number of the local node and the number of the node that was the last to be granted bus access; and
   means for gating the relative node priority onto said arbitration bus.

3. A multi-master communication bus system as set forth in claim 2, wherein said means for computing the relative node priority includes:
   an adder circuit having a first input coupled to receive a node number from said means for registering the number of the last node to be granted bus access, and a second input coupled to receive the local node number;
   means for inverting one of said first and second inputs;
   means for supplying a logical "one" carry input to said adder circuit, to produce a two's complement difference output.

4. A multi-master communication bus system as set forth in claim 3, wherein:
   said means for inverting functions to invert said first input; and
   the relative node priority is obtained by subtracting the number of the last node to be granted bus access from the local node number, and treating the two's complement difference as an unsigned integer.

5. A multi-master communication bus system as set forth in claim 3, wherein:
said means for generating a composite node number operates as a logical OR circuit;
said bus request resolution means includes a bit-by-bit ripple comparison circuit for comparing the composite node number with the locally generated relative node priority, means associated with said comparison circuit for removing the locally generated relative node priority from assertion on said arbitration bus if said comparison circuit detects nonmatching bits, and means for generating a signal indicative of bus grant if all corresponding bits in the compared node numbers match, whereby removal of a relative node priority from assertion on said arbitration bus results in regenation of the composite node number and removal of the local node from contention for bus access.

6. A multi-master communication bus system as set forth in claim 5, wherein said comparison circuit includes a plurality of bit comparison blocks, each of which includes:
a first input circuit connected to a line of said arbitration bus;
a second input circuit connected to receive one bit of the relative node priority;
an output circuit;
an arbitration enabling circuit connected in said output circuit to couple an output relative node priority signal to a line of said arbitration bus, if an arbitration timing signal is present;
a comparison enabling circuit; and
a pass/fail output line connected to supply a signal to the comparison enabling circuit of the next bit comparison block;
and wherein
said comparison enabling signal for the first of said bit comparison blocks is derived from a bus request signal,
a pass signal is generated to enable the next comparison block to generate outputs on said output circuit and said pass/fail output line only if said first and second input circuits supply identical binary inputs, and
the pass/fail line from the last of said bit comparison blocks indicates a bus grant.

7. A multi-master communication bus system having a plurality of communication nodes, said system comprising:
a data bus for the transmission of information from node to node;
an arbitration bus, including an arbitration synchronization line for the transmission of synchronization signals and a set of arbitration priority lines for the transmission of signals for the resolution of conflicts between multiple requests for bus access;
means located at each node for detection and generation of synchronization signals on said arbitration synchronization line;
means located at each node for registering a unique node number associated with each node;
means located at each node and responsive to a locally generated request for bus access, for determining and asserting onto said arbitration priority lines a relative node priority;
means associated with said arbitration priority lines for generating a composite node number that is the logical OR of all relative node priorities asserted onto said arbitration priority lines;
bus request resolution means located at each node for detecting the composite node number and determining therefrom whether the request for bus access is successful;
means located at each node for asserting onto said arbitration priority lines the number of the node that has been granted bus access;
means located at each node for registering the number of the last node to be granted bus access; and
timing means located at each node, to regulate arbitration operations in relation to the synchronization signals.

8. A multi-master communication bus system as set forth in claim 7, wherein said means for determining and asserting a relative node priority includes:
means for computing the relative node priority as the difference between the number of the local node and the number of the node that was the last to be granted bus access; and
means for gating the relative node priority onto said arbitration priority lines.

9. A multi-master communication bus system as set forth in claim 8, wherein said means for computing the relative node priority includes:
an adder circuit having a first input coupled to receive a node number from said means for registering the number of the last node to be granted bus access, and a second input coupled to receive the local node number;
means for inverting one of said first and second inputs;
means for supplying a logical "one" carry input to said adder circuit, to produce a two's complement difference output.

10. A multi-master communication bus system as set forth in claim 9, wherein:
said means for inverting functions to invert said first input; and
the relative node priority is obtained by subtracting the number of the last node to be granted bus access from the loeal node number, and treating the two's complement difference as an unsigned integer.

11. A multi-master communication bus system as set forth in claim 8, wherein:
said means for generating a composite node number operates as a logical OR circuit;
said bus request resolution means includes a bit-by-bit ripple comparison circuit for comparing the composite node number with the locally generated relative node priority, means associated with said comparison circuit for removing the locally generated relative node priority from assertion on said arbitration priority lines if said comparison circuit detects non-matching bits, and means for generating a signal indicative of bus grant if all corresponding bits in the compared node numbers match, whereby removal of a relative node priority from assertion on said arbitration priority lines results in regeneration of the composite node number and removal of the local node from contention for bus access.

12. A multi-master communication bus system as set forth in claim 11, wherein said comparison circuit includes a plurality of bit comparison blocks, each of which includes:

a first input circuit connected to one of said arbitration priority lines;

a second input circuit connected to receive one bit of the relative node priority;

an output circuit;

an arbitration enabling circuit connected in said output circuit to couple an output relative node priority signal to one of said arbitration priority lines, if an arbitration timing signal is present;

a comparison enabling circuit; and a pass/fail output line connected to supply a signal to the comparison enabling circuit of the next bit comparison block;

and wherein said comparison enabling signal for the first of said bit comparison blocks is derived from a bus request signal, a pass signal is generated to enable the next comparison block to generate outputs on said output circuit and said pass/fail output line only if said first and second input circuits supply identical binary inputs, and the pass/fail line from the last of said bit comparison blocks indicates a bus grant.

13. A multi-master communication bus system having a plurality of communication modes, said system comprising:

a data bus for the transmission of information from node to node;

an arbitration bus, including an arbitration synchronization line for the transmission of synchronization signals and a set of arbitration priority lines for the transmission of signals for the resolution of conflicts between multiple request for bus access;

means located at each node for registering a unique local node number associated with each node;

means located at each node for asserting onto said arbitration priority lines the number of the node that has been granted bus access;

means located at each node for registering the number of the last node to be granted bus access;

timing means located at each node, to regulate arbitration operations in relation to the synchronization signals;

an adder circuit having a first input coupled to receive a node number from said means for registering the number of the last node to be granted bus access, and a second input coupled to receive the local node number;

means for inverting one of said first and second inputs;

means for supplying a logical "one" carry input to said adder circuit, to produce a two's complement difference output that is the relative node priority;

means for gating the relative node priority onto said arbitration priority lines;

means located at each node for detection and generation of synchronization signals on said arbitration synchronization line;

means associated with said arbitration priority lines for generating a composite node number that is the logical OR of all relative node priorities asserted onto said arbitration priority lines; and bus request resolution means located at each node for detecting the composite node number and determining therefrom whether the request for bus access is successful, wherein said bus request resolution means includes a bit-by-bit ripple comparison circuit for comparing the composite node number with the locally generated relative node priority, means associated with said comparison circuit for removing the locally generated relative node priority from assertion on said arbitration priority lines if said comparison circuit detects non-matching bits, and means for generating a signal indicative of bus grant if all corresponding bits in the compared node numbers match, whereby removal of a relative node priority from assertion on said arbitration priority lines results in regeneration of the composite node number and removal of the local node from contention for bus access.

14. A multi-master communication bus system as set forth in claim 13, wherein said comparison circuit includes a plurality of bit comparison blocks, each of which includes:

a first input circuit connected to one of said arbitration priority lines;

a second input circuit connected to receive one bit of the relative node priority;

an output circuit;

an arbitration enabling circuit connected in said output circuit to couple an output relative node priority signal to one of said arbitration priority lines, if an arbitration timing signal is present;

a comparison enabling circuit; and a pass/fail output line connected to supply a signal to the comparison enabling circuit of the next bit comparison block;

and wherein said comparison enabling signal for the first of said bit comparison blocks is derived from a bus request signal, a pass signal is generated to enable the next comparison block to generate outputs on said output circuit and said pass/fail output line only if said first and second input circuits supply identical binary inputs, and the pass/fail line from the last of said bit comparison blocks indicates a bus grant.

15. A method for resolving conflict between requests from multiple communication nodes for access to a common communication bus, said method comprising the steps of:

receiving a request for access to a data bus;

determining a relative node priority by computing the difference between a local node number and the number of the last node to be granted bus access;

asserting, in response to receipt of a request for bus access, the relative node priority on an arbitration bus;

logically ORing all asserted relative node priorities to generate a composite node number on the bus;

comparing the composite node number with the locally determined relative node priority to determine whether the local node is to have bus access;

transmitting synchronization signals on the arbitration bus, in unison with the other nodes;

generating timing signals to control said steps of determining, asserting and comparing.

16. A method as set forth in claim 15, and further including the steps of:

transmitting from time to time the number of the node that was last to be granted bus access; and latching at each node the number of the node that was last to be granted bus access.

17. A method as set forth in claim 16, wherein said comparing step includes:

comparing first corresponding bits in a first comparison stage, and if equal, enabling a second comparison stage;

comparing second and successive pairs of corresponding bits, and if equal, enabling a subsequent comparison stage;

disabling said asserting step if any pair of corresponding bits do not match in said comparing steps; and generating a bus grant signal if all pairs of corresponding bits match in said comparing steps.

* * * * *